United States Patent [19]

Seven et al.

[11] 4,177,336
[45] Dec. 4, 1979

[54] PREPARATION OF POLYOLEFIN CONTAINING MULTIPLE OLEFINIC UNSATURATION AND CARBOXYLIC ACID GROUPS AND POLYOLEFIN SO PREPARED

[75] Inventors: Manfred K. Seven, Long Valley, N.J.; Francis J. Olearczyk, deceased, late of Kenmore, N.Y., by Jean R. Olearczyk, administratrix

[73] Assignee: Allied Chemical Corporation, Morristown, N.J.; by said Manfred K. Seven

[21] Appl. No.: 859,906

[22] Filed: Dec. 12, 1977
(Under 37 CFR 1.47)

[51] Int. Cl.² .................. C08F 6/00; C08F 210/02
[52] U.S. Cl. .......................... 525/325; 204/159.2; 260/29.6 TA; 525/356; 525/383; 525/386; 526/317
[58] Field of Search .................. 526/16, 53, 285, 317

[56] References Cited

U.S. PATENT DOCUMENTS

| | | | |
|---|---|---|---|
| 3,215,678 | 11/1965 | Adelman | 526/317 |
| 3,386,978 | 6/1968 | Salyer | 526/10 |
| 3,723,397 | 3/1973 | Hoh et al. | 526/317 |
| 3,814,734 | 6/1974 | Kawasumi et al. | 526/285 |
| 3,909,280 | 9/1975 | Dench et al. | 106/271 |
| 3,969,297 | 7/1976 | Teer et al. | 526/317 |

*Primary Examiner*—Harry Wong, Jr.
*Attorney, Agent, or Firm*—Alan M. Doernberg; Jay P. Friedenson

[57] ABSTRACT

Terpolymers of a lower olefin, a vinyl ester and a 2-ene-carboxylic acid are reacted with water at elevated temperatures to produce a polyolefin containing multiple olefinic unsaturation and carboxylic acid groups. Ester groups are converted to olefinic unsaturations by elimination of acid such as acetic acid.

The carboxylic acid groups give the product polymer emulsifiability in water, while the double bonds cause the polymer to be sensitive to ultraviolet light and suitable as chemical intermediates for further reaction at the sites of the double bond.

24 Claims, No Drawings

PREPARATION OF POLYOLEFIN CONTAINING MULTIPLE OLEFINIC UNSATURATION AND CARBOXYLIC ACID GROUPS AND POLYOLEFIN SO PREPARED

BACKGROUND OF THE INVENTION

Polyethylene copolymers having pendant ester groups such as ethylene/vinyl acetate (EVA) are conventionally subjected to alkaline hydrolysis to form the alcohol. For example, EVA (with xylene to promote solubility) is reacted in alcoholic sodium or potassium hydroxide to form a material with multiple OH groups. It is possible to form double bonds by dehydrating the polyhydroxy compound with a strong dehydrating agent such as sulfuric acid. Otherwise, it is difficult to introduce unsaturation into a polyethylene backbone other than between the terminal carbon and the adjacent carbon (forming an alpha olefin).

It would be desirable for some applications to introduce olefinic bonds into a polymer that has sufficient hydrophilic groups to be water soluble or at least easily emulsified in water. Polymers such as ethylene/acrylic acid (EAA) have this property. It would be theoretically possible to treat a terpolymer of ethylene, vinyl acetate and acrylic acid with alcoholic sodium hydroxide and then dehydrate to introduce unsaturation. In practice, the presence of free, pendant carboxy groups causes rapid esterification between a carboxy group and a hydroxy group on the same or different chain, resulting in cross-linking and a rapid increase in viscosity. The present invention overcomes this obstacle by synthesizing polyunsaturated, polycarboxylated polyolefins by a direct method, thus forming novel compounds. The products differ from "alpha olefins" is having both double bonds and pendant carboxyl groups throughout the chain and not merely at the terminal carbon.

Copolymers of alkenes and 2-ene-carboxylic acids are known to have emulsifiability properties not present in polyalkenes. For example, copolymers of ethylene with acrylic acid, methacrylic acid or ethacrylic acid in minor amounts are easily emulsified in water. By 2-ene-carboxylic acids are meant the compounds of the formula

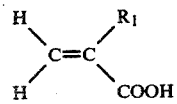

The acids of particular interest are those where $R_1$ is H or methyl or ethyl (respectively acrylic, methacrylic and ethacrylic). Higher acids could be used, but are not as common. These acids are also referred to as alpha-beta unsaturated acids. The alkenes or olefins involved usually include ethylene, propene, 1-butene, 2-butene and butadiene, with ethylene being the most common monomer.

Terpolymers of ethylene, an ester such as vinyl acetate and acrylic acid are disclosed in U.S. Pat. Nos. 3,215,678 and 3,909,280. U.S. Pat. No. 3,215,678 indicates that any vinyl ester of a 1–6 carbon, saturated, monobasic carboxylic acid may be used as the ester monomer, with the preferred esters being vinyl formate, vinyl propionate and the vinyl butyrates, and the most preferred ester being vinyl acetate:

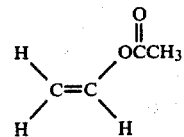

It should be appreciated that, after polymerization, each alkene monomer becomes

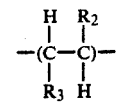

with $R_2$ and $R_3$ each being H or methyl or ethyl (in the preferred polyethylene polymers, $R_2$ and $R_3$ are both H). Also after polymerization, each 2-ene-carboxylic acid monomer becomes

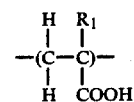

wherein $R_1$ is H or alkyl having 1–5 carbons. Also, after polymerization, each vinyl ester monomers becomes

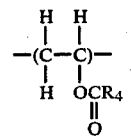

wherein $R_4$ is H or alkyl having 1–5 carbons (preferably methyl or ethyl). Hereafter carbon-bonded hydrogens will be omitted. Thus the terpolymers of alkene 2-ene-carboxylic acid and vinyl ester have the formula

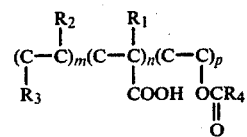

wherein m, n and p are integers representing the relative proportions of the three monomers, with the monomers being arranged in substantially random order.

U.S. Pat. No. 3,215,678 discloses copolymers of ethylene with certain ester and acid comonomers. Briefly, a major portion of ethylene is copolymerized with at least 5% by weight of a vinyl ester of a lower (1–6 carbon) saturated monobasic aliphatic carboxylic acid and 0.01 to 10% by weight of acrylic or methacrylic acid, the balance consisting essentially of ethylene. A mixture of comonomers is copolymerized in the presence of a free-radical polymerization initiator such as a peroxygen compound, e.g., lauryl peroxide or t-butyl peracetate, or an azobis compound, e.g., azobisisobutyronitrile, at a somewhat elevated temperature, e.g., 90°–250° C. and at a pressure of 1000 to 1750 atmospheres. The polymer has melt indexes from 0.5 to 200 and generally 5 to 25, indicative of a high polymer molecular weight. The above patent is incorporated herein for a detailed description of the process and product.

U.S. Pat. No. 3,909,280 discloses ethylene/acrylic acid/vinyl acetate telomer waxes prepared by reacting 2 to 7 (preferably 3-4) mole % of acrylic acid and 0.5 to 8 (preferably 3-5) mole % of vinyl acetate, both based on ethylene, in the presence of a free radical initiator and a telogen. The mixture is reacted in the vapor phase of a suitable reactor at temperatures of from about 140° C. to 200° C. and pressures of from about 5,000 to 10,000 psi in known manner; and, once equilibrium is established, the product is continually withdrawn from the bottom of the reactor as it is formed. Free radical initiators, including peroxy and azo initiators are used in amounts of about $1.3 \times 10^{-4}$ to about $4 \times 10^{-4}$ mols of initiator per mol of monomer. A telogen is used (containing generally up to four carbons and up to two oxygens and being free of olefinic unsaturation) in amounts of about 12 to 28%, by weight of ethylene, preferably remaining relatively constant ($\pm 1\%$) once equilibrium was established in the reactor. The above patent is incorporated herein for a detailed description of the process and product.

BRIEF DESCRIPTION OF THE INVENTION

The present invention includes the process comprising heating a terpolymer of the formula

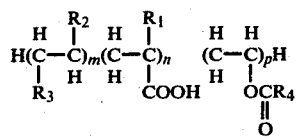

having a number average molecular weight of about 1,000 to about 10,000 and wherein m, n and p are integers, $R_1$, $R_2$ and $R_3$ are each H, methyl or ethyl, and $R_4$ is H or alkyl having 1-5 carbons, in the presence of water at an elevated temperature for a time sufficient to remove substantially all ester groups and to form an unsaturated, carboxylated polyolefin of the formula

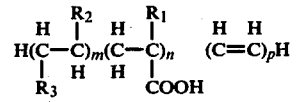

wherein m, n, p, $R_1$, $R_2$ and $R_3$ are as described above.

The present invention also includes polyunsaturated, polycarboxylated polyolefins of the immediately above formula. Such polyunsaturated, polycarboxylated polyolefins are themselves useful as components in ultraviolet light-cured inks, coatings and rubber lubricants, and are also useful as chemical intermediates.

DETAILED DESCRIPTION OF THE INVENTION

Known copolymers and terpolymers including free carboxylic acid groups are of particularly utility because of their emulsifiability. This property is found in the copolymers of ethylene and acrylic acid known generally in the art, and also in the ethylene/acrylic acid/vinyl acetate ester terpolymers disclosed in U.S. Pat. Nos. 3,215,678 and 3,909,280. The present invention is concerned with a process and product in which the advantage of an emulsifiability is surprisingly retained while the advantages of unsaturation are also obtained.

Briefly, the vinyl ester moieties or groups of the terpolymer are each of the formula

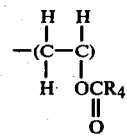

and might be de-esterified to form the corresponding alcohol

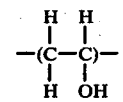

It has been surprisingly found that, in the presence of water at about 170° C. or above, this process either goes one step further, by dehydration to the unsaturate or, more likely, undergoes a direct elimination of $R_4COOH$ to the unsaturate. This is important for the above-described terpolymers in that hydroxyl groups will react with carboxyl groups on the same or different polymer backbone to form ester-bonded crosslinks which are undesired.

It will be appreciated that such a double bond, forming an unsaturation point, would otherwise be introduced into a polyethylene-type polymer only with great difficulty.

As shown in the examples below, it has also been surprisingly found that the present reaction permits virtually complete formation of double bonds in the polymer backbone at the former situs of each ester moiety, with loss of emulsifiability (as by decarboxylation of the acid groups) being minimized. Thus, one might expect temperatures and other conditions sufficient for de-esterification or elmination of acid to promote the undesired decarboxylation of an acrylate residue as follows:

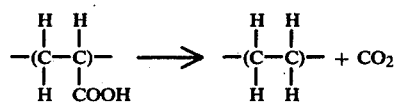

Surprisingly, this side reaction is not observed in substantial amounts. To the extent that decarboxylation does occur, it can be compensated for by providing a greater proportion of 2-ene-carboxylic acid monomers and lesser proportion of alkene monomers than are desired as moieties in the product polyolefin. The degree of decarboxylation is important, however, in that, for example, ethylene is more readily available than acrylic acid, and in that a substantial degree of decarboxylation may cause a disproportionately small acid group ratio in many individual molecules or chain portions.

The reaction involves a starting material of the formula

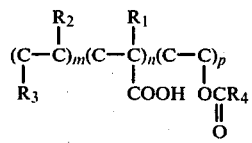

It will be appreciated that the integers m, n and p represent relative proportions of monomer residues found in each molecule, but that the total ratio of m, n and p will depend upon the molar proportion of the three types of monomers polymerized. While most molecules will have ratio of m:n:p fairly close to that of the entire sample, it should be understood that the relative proportion of moieties in each molecule, as well as the distribution of monomer moieties in each molecule, will normally be random. In many terpolymers, the lower molecular weight materials have the highest proportion of acid and ester. Thus the preferred proportions of m:n:p described below represent molar proportions of monomers polymerized and are only approximations of the proportion of actual moieties in each molecule.

With the above understanding, the preferred proportion of 2-ene-carboxylic acid moieties is about 0.2 to about 6 mole percent and the preferred proportion of vinyl ester moieties is about 0.3 to about 6.5 mole percent, both based upon moles of alkene. Thus, in the preferred ethylene/acrylic acid/vinyl acetate terpolymers, the proportion of acrylic acid moieties is about 0.3 to about 6.5 mole percent (about 1 to about 20 weight percent) and the proportion of vinyl acetate moieties is about 0.2 to about 6 mole percent (or about 0.5 to about 15 weight percent), all percentages based on amount of ethylene.

Thus the preferred ratio of n to m is on the average between about 0.002:1 and about 0.06:1 and the preferred ratio of p to m is on the average between about 0.003:1 and about 0.065:1.

It is more preferred that the proportion of acid moieties be about 0.2 to about 3 mole percent (about 0.5–8 weight percent for acrylic acid) and most preferred as about 0.4 to 3 mole percent (about 1–8 weight percent for acrylic acid). It is more preferred that the vinyl ester moieties be about 0.65 to about 2 mole percent (about 2–7 weight percent for vinyl acetate).

Thus the more preferred ratio of n to m is on the average between about 0.002:1 and about 0.03:1 and the more preferred ratio of p to m is between about 0.0065:1 and about 0.02:1. The most preferred ratios of n to m are between about 0.004 and about 0.03.

The preferred number average molecular weight range of about 1,000 to about 10,000 (and the more preferred range of about 1,000 to about 5,000) inherently place upper and lower limits on m, n and p. By "number average" is meant, statistically, the simple average or total weight divided by number of moles (which strongly correlates with viscosity in the range considered herein) rather than the weighted average.

As indicated, the preferred terpolymers are ethylene/acrylic acid/vinyl acetate, as, for example, disclosed in the above referenced to patents. The alkene moiety could also be propene, 1-butene or 2-butene, or could contain a mixture of such alkenes. Polymers having the major proportion of ethylene and about 1–5 mole percent of one or more of the above higher alkenes could, for example, be used. The presence of small alkyl groups as $R_2$ or $R_3$, due to the use of alkenes higher than ethylene, plays no substantial role in the present reaction.

Similarly, the acid residue may be acrylic, methacrylic or ethacrylic, with $R_1$ being, correspondingly, H or methyl or ethyl, or mixtures thereof. These groups also have insubstantial effects upon the present reaction, although their presence may affect the properties of the unsaturated polymer product. Mixtures of acid moieties may be present to provide the unsaturated polymer product a combination or blend of several desired features. Acrylic acid moieties are preferred.

Several vinyl acid moieties may be used, with $R_4$ being H or alkyl having 1–5 carbons. The preferred vinyl ester is vinyl acetate with $R_4$ being methyl. The choice of vinyl ester has some affect on the rate of de-esterification and thus may affect the relative amount of desired double bond formation compared to undesired decarboxylation or crosslinking. For a particular desired product, terpolymers of several vinyl esters may be tested with the same proportion of vinyl ester to alkene, and the terpolymer showing the least decarboxylation or other side reaction during double bond formation will normally be chosen.

It should be understood that the term "terpolymer" is used even though one or more of the three monomer types may be a mixture of homologous compounds. Preferably, the terpolymer has a number average molecular weight between about 1,000 and about 10,000, more preferably between about 1,000 and about 5,000.

In carrying out the process of the present invention, the precise temperatures and time periods are not critical. However, it has been found that elevated temperatures of, preferably, from about 170° C. to about 300° C. produce relatively rapid elimination to the unsaturated material with about 170° C. to about 250° C. being more preferred and about 180° C. to about 230° C. being most preferred.

In general, temperatures at the low end of the broad range produce rapid enough acid elimination and a minimum of cross-linking or acid attack so as to degrade the polymer. It is believed that excessive temperatures produce cross-linking while high by-product acid ($R_4$COOH) concentration causes degradation. A generally low temperature may reduce double bond cross-linking and acid degradation directly and may also increase the amount of water immediately available, thereby suppressing cross-linking through the double bond and degradation by acid.

The amount of water present should be sufficient to remove the free carboxylic acid formed by de-esterification (acetic acid if vinyl acetate is used) from the polymer, as well as to prevent double bond cross-linking. It appears that free acid discolors and/or degrades the polymer if not removed from the reaction zone. In general, the water should be present in a weight ratio to initial terpolymer of at least about 0.5:1 and more preferably about 0.8:1 to about 10:1 and most preferably about 0.9:1 to about 2.0:1. During the reaction, water may be periodically vented and fresh water added, so as to remove free acid with vented water and to restore the desired water to polymer ratio with the fresh water. Alternatively, venting and addition of water may be continuous. It should be understood that, in normal operation, autogenous pressures are created by the reaction mixture, up to about 800 psia or whatever saturated steam pressure corresponds to the reaction temperature.

The reaction is continued until the vinyl ester groups are substantially all converted to double bonds. By "substantially all" it should be understood that some side reaction (as by cross-linking) may occur, but that no easily measurable amounts of acid $R_4$COOH are any longer going into the water phase. Also few, for example, less than two on the average, ester moieties should remain per chain. Products with remaining ester groups are subject to deesterification (forming the alcohol) and esterification with pendant carboxy groups (causing cross-linking).

In some of the examples that follow, a plurality of temperatures within the above-described range were or are employed between the step of adding fresh water and the next step of venting water. Thus it is preferred that the process include reacting the terpolymer with water at a first reaction temperature, then venting a portion of the water, then reacting the terpolymer with water at a second reaction temperature, then venting a portion of the water. These reacting and venting steps may be repeated several times. It is even more preferred that the process include adding fresh water after each venting step except the last. Alternatively, these steps may be continuous by use of a high pressure pump capable of sustaining and autogenous pressure for the desired temperature.

The unsaturated carboxylated polymer so formed is of the formula

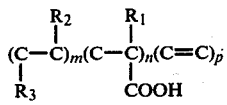

wherein $R_1$, $R_2$ and $R_3$ are each H or methyl or ethyl and m, n and p are integers. It will be appreciated that m, n and p are approximately the same numbers m, n and p as for the terpolymer starting material. A small number of ester cross-links between 2-ene-carboxylic acid residues and former vinyl ester residues may also be present, either between acids and esters of the same chain or of different chains. The formation of these ester cross-links can be shown by the following reaction sequence

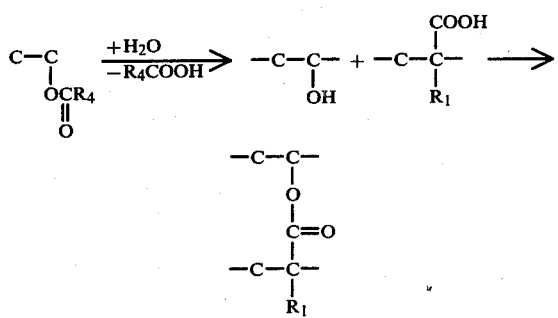

Such cross-links, as evidenced by an increase in viscosity, are generally unpreferred and are preferably minimized. Cross-links between unsaturated moieties in the product may also form.

These product polymers can be emulsified because of the free carboxylic acid groups, and are photoreactive because of the double bonds. Thus they are useful in latex paintsand ultraviolet light cured inks and coatings and in rubber lubricants. In the presence of ultraviolet light, the product cross-links between double bonds or with double bonds in other materials. Such cross-linking also occurs with peroxides and other free radical initiators (as for example present in synthetic rubber prepolymers, causing the product to cross-link into the rubber matrix). Additionally, the product polymers are useful as intermediates with the double bonds forming selective addition points as by the sequence:

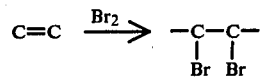

The brominated product is both emulsifiable (because of the pendant carboxyl groups) and flame retardant (because of the bromines). Another possible addition at the double bond is of an unsaturated acid anhydride (such as maleic anhydride):

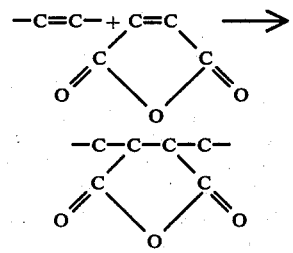

The product has both random isolated pendant carboxy groups (from the 2-ene-carboxylic acid) and pairs of adjacent carboxylic acid groups or their anhydride (from the maleic acid).

EXAMPLES

EXAMPLE 1

Preparation of Terpolymer Starting Material

To a suitable reactor maintained at a pressure of 7000 psig with ethylene and a temperature of 165° there is admitted a mixture consisting of acrylic acid, vinylacetate, a suitable halogen and free radical catalyst. The polymer formed is continuously withdrawn from the reactor and separated from unreacted monomers. Acrylic acid and vinylacetate concentration may be varied as desired to obtain the feedstocks for preparing the unsaturated acid terpolymers. This is the same as in U.S. Pat. No. 3,909,280 Example 1, but Example 2 may also be used. Other processes of preparing terpolymers may be used. The proportions of the three feedstocks may be varied to alter the properties of both the terpolymer and the unsaturated product.

EXAMPLE 2

A 900 gram sample of an ethylene/vinyl acetate/acrylic acid terpolymer prepared as in Example 1 was added to a 4 liter stirred autoclave with 800 gms of distilled water in the absence of air and heated to 260° C. After ½ hour reaction at 260° C. the autogeneous pressure in the reactor developed by the water was vented to 20 psig and an additional 800 gms of distilled water then pressured into the reactor. The reactor temperature was then increased to 275° C. and the reaction carried out for a ½ hour followed by venting and distilled water addition. The reactor temperature was then increased to 290° C.; and, after ½ hour, the autogeneous pressure was vented. The cycle of distilled water injection, one half hour reaction step, and venting step were repeated three additional times prior to cooling the reactor to 150° C. and discharging the product from the reactor.

TABLE 1

| Example | | Saponification No. - MgKOH/q | Acid No. MgKOH/q | Ester No. MgKOH/q | Viscosity CPS | % Iodine | % C=C Groups |
|---|---|---|---|---|---|---|---|
| 2 | Initial Terpolymer | 68.6 | 40.0 | 28.6 | 320 | — | — |
| 2 | Product Polyolefin | 32.7 | 33.1 | —0— | 930 | 20.8 | 1.93 |
| 3 | Initial Terpolymer | 96.9 | 40.7 | 56.2 | 380 | — | — |
| 3 | Product Polyolefin | 38.5 | 33.8 | 4.7 | 9600 | 10.6 | 0.98 |
| 4 | Initial Terpolymer | 68.6 | 39.7 | 28.9 | 300 | — | — |
| 4 | Product Polyolefin | 41.6 | 35.8 | 5.8 | 1700 | 7.7 | 0.72 |

EXAMPLE 3

A 900 gram sample of an ethylene/vinyl acetate/acrylic acid terpolymer prepared by the procedure of Example 1 was treated with 800 ml portions of distilled water by a procedure similar to that of Example 2, except that the temperature was controlled at 240° C. throughout the reaction and the number of venting and reactor addition steps totalled four and the reaction steps (of one hour duration each) totalled four. The terpolymer employed in the reaction contained a higher level of ester content than used in Example 2.

EXAMPLE 4

A 900 gm sample of an ethylene/vinyl acetate/acrylic acid terpolymer was treated with 800 ml portions of distilled water by a procedure similar to Example 2. The reaction temperature was controlled at 225° C. throughout the reaction. The number of venting and water addition steps totalled six each and the reaction steps (of one hour duration each) totalled six.

Each of the starting material terpolymers and product unsaturated, carboxylate polyolefins of Examples 2, 3 and 4 were easily emulsified in water.

Standard analyses were conducted on the initial terpolymers or starting materials and the product polyolefins or carboxylated, unsaturated polyolefins. Saponification numbers and acid numbers were obtained indicative of the number of free acid groups. An "ester number" was then obtained indicative of the number of ester bonds, either from vinyl acetate moieties not de-esterified or from cross-links. A viscosity (in centipoise at 140° C.) was obtained with a Brookfield viscometer. The amount of iodine reacting with the polymer as grams $I_2$ per 100 gm sample was used to determine the extent of unsaturation. The results of these tests are displayed in Table 1. The decrease in observed acid number in all three cases is believed due to a relatively high proportion of acid groups in the lower weight fraction of the terpolymer which is preferentially lost to the aqueous phase.

The results indicate that substantially identical terpolymer starting materials of Examples 2 and 4 both produced product polyolefins with a high number of unsaturated groups and a high remaining acid number. It should be noted that the reaction temperatures in Example 2 varied from 260° C. to 290° C., while the reaction temperature in Example 4 was a consistent 225° C. The product of Example 2 illustrates a substantially greater number of double bonds, only slightly lower acid number than the product of Example 4 and a complete absence of detectable ester groups. Infrared spectroscopy revealed no hydroxyl groups present in the product of Example 2.

Example 3 shows that with a somewhat different terpolymer, a substantial unsaturation content was produced while a high number of carboxyl groups were retained. The relatively large increase in viscosity (apparently caused by ester cross-linkage) may, however, render this particular sample less suitable for some applications.

EXAMPLES 5-11

Terpolymers are prepared from the alkene, 2-ene-carboxylic acid and vinyl ester shown in the first several columns of Table 2. The numbers following the acid and ester name represent the mole % of each monomer by mole % of alkene. Each terpolymer is then reacted with water for the periods and number of steps shown, with the reaction mixture vented and repressurized with fresh water to the indicated pressure between reaction steps. The product polymers each have a high proportion of unsaturate groups and retained acid number.

TABLE 2

| | TERPOLYMER | | | REACTION | | |
|---|---|---|---|---|---|---|
| Example | Alkene | 2-ene-carboxylic acid (mole %) | Vinyl Ester (mole %) | Temperature (°C.) | Period | Number of Reacting Steps |
| 5 | Ethylene | methacrylic (2.0) | Acetate (2.28) | 240 | ½ hr | 2 |
| | | | | 200 | ½ hr | 5 |
| 6 | Propene | Ethacrylic (1.5) | Formate (6.5) | 230 | 1 hr | 1 |
| | | | | 180 | ½ hr | 6 |
| 7 | 1-Butene | Acrylic (1.0) | Acetate (0.38) | 240 | 1 hr | 2 |
| | | | | 250 | ½ hr | 4 |
| 8 | 2-Butene | Acrylic (0.38) | n-butyrate (4) | 260 | 1 hr | 5 |
| | | | | 170 | ½ hr | 1 |
| 9 | Ethylene | Acrylic (3.10) | Caproate (hexanoate) (4) | 220 | 1 hr | 3 |
| | | | | 250 | 1 hr | 2 |
| | | | | 200 | 1 hr | 1 |
| 10 | Ethylene | Acrylic (0.32) | Acetate (6.5) | 170 | ½ hr | 2 |
| | | | | 180 | 1 hr | 1 |
| | | | | 300 | ½ hr | 1 |
| 11 | Ethylene | Acrylic (6.5) | Acetate (0.32) | 250 | ½ hr | 2 |
| | | | | 180 | 1 hr | 2 |
| | | | | 170 | 1 hr | 2 |

EXAMPLES 12–18

Example 2 is repeated with the treatment being at a high temperature with a pump continuously feeding fresh hot water into the system and maintaining the autogenous pressure being maintained. The constant temperature (in °C.), steam rates and times are indicated in Table 3. Steam (with acetic acid) and product are continuously withdrawn at rates matching the feeds of water and terpolymer.

Table 3

| Temperature | Pressure | Water Feed Rate (lbs/lb of terpolymer) | Residence Time |
|---|---|---|---|
| 170 | Autogenous | 1.0 | 60 minutes |
| 180 | " | 1.5 | 60 minutes |
| 230 | " | 1.5 | 40 minutes |
| 300 | " | 4.0 | 10 minutes |
| 250 | " | 2.0 | 20 minutes |
| 220 | " | 2.0 | 30 minutes |
| 200 | " | 1.5 | 30 minutes |

EXAMPLE 19

Emulsification

The polyunsaturated, polycarboxylic acid polymers may be emulsified by blend melting 40 parts of the product of Example 2 together with 10 parts of an ethoxylated oleyl alcohol surfactant, 1 part ethylene glycol, 1 part potassium hydroxide and 4 parts of diethylaminoethanol. The heated blend is slowly poured into 155 parts of rapidly agitated hot water.

EXAMPLE 20

Ten grams of the emulsified polyunsaturated, polycarboxylic polymer product of Example 19 is added as a lubricant to 1000 grams of a synthetic rubber formulation. Upon curing with a peroxide, the lubricant is cross-linked into the rubber matrix.

We claim:

1. A method of producing a polyolefin containing multiple olefinic unsaturation and carboxylic acid groups comprising reacting a terpolymer of the formula

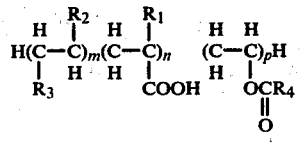

having a number average molecular weight between about 1,000 and about 10,000 wherein m,n and p are integers with the ratio of n to m being on the average between about 0.002:1 and about 0.06:1 and the ratio of p to m being on the average between about 0.003:1 and about 0.065:1, $R_1$, $R_2$ and $R_3$ are each H, methyl or ethyl and $R_4$ is H or alkyl having 1–5 carbons, in the presence of water at an elevated reaction temperature for a time sufficient to remove substantially all ester groups and to form an unsaturated, carboxylated polyolefin of the formula

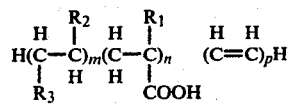

wherein m, n, p, $R_1$, $R_2$ and $R_3$ are as described above.

2. The method of claim 1 wherein the reaction temperature is about 170° C. to about 300° C.

3. The method of claim 2 wherein the reaction temperature is about 170° C. to about 300° C.

4. The method of claim 2 wherein the temperature is about 180° C. to about 230° C.

5. The method of claim 1 wherein the ratio of n to m is on the average between about 0.002:1 and about 0.03:1.

6. The method of claim 5 wherein the ratio of n to m is on the average between about 0.004:1 and about 0.03:1.

7. The method of claim 5 wherein the ratio of p to m is on the average between about 0.0065:1 and about 0.02:1.

8. The method of claim 1 wherein water is present at a weight ratio of water to terpolymer between about 0.8:1 and about 10:1.

9. The method of claim 1 wherein the terpolymer is mixed with water at the reaction temperature, reacted under autogeneous pressure and then a portion of the water is vented.

10. The method of claim 9 wherein reacting and venting steps are repeated.

11. The method of claim 10 wherein fresh water is added before each reacting step.

12. The method of claim 10 wherein the reacting steps are conducted at a plurality of reaction temperatures.

13. The method of claim 9 wherein a portion of the water is continuously being vented and water is continuously being added.

14. The method of claim 1 wherein the terpolymer has a number average molecular weight between about 1,000 and 5,000.

15. The method of claim 1 wherein the terpolymer is a copolymer of ethylene, vinyl acetate and a 2-ene carboxylic acid selected from the group consisting of acrylic acid, methacrylic acid and ethacrylic acid.

16. The method of claim 15 wherein said 2-ene carboxylic acid is acrylic acid.

17. The method of claim 16 wherein said terpolymer is formed from about 0.5 to about 8 weight percent acrylic acid and about 2 to about 7 weight percent vinyl acetate.

18. A polyunsaturated, emulsifiable polymer having a number average molecular weight between about 1,000 and about 10,000 of the formula

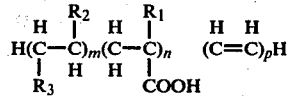

wherein $R_1$, $R_2$ and $R_3$ are each H, methyl or ethyl, and m, n and p are integers with the ratio of n to m being on the average between about 0.002:1 and about 0.06:1 and the ratio of p to m being on the average between about 0.003:1 and about 0.065:1.

19. The polymer of claim 18 wherein the ratio of n to m is on the average between about 0.002:1 and about 0.03:1.

20. The polymer of claim 19 wherein the ratio of n to m is between about 0.004:1 and about 0.03:1.

21. The polymer of claim 19 wherein the ratio of p to m is between about 0.0065:1 and about 0.02:1.

22. The polymer of claim 18 wherein $R_2$ and $R_3$ are both H.

23. The polymer of claim 22 wherein $R_1$ is H.

24. The polymer of claim 18 having a number average molecular weight between about 1,000 and about 5,000.

* * * * *